Dec. 2, 1958 S. A. B. DAHLGREN 2,862,658
METHOD AND APPARATUS FOR CENTRIFUGAL SEPARATION
OF A MIXTURE OF SOLIDS AND TWO LIQUIDS
Filed May 15, 1953 2 Sheets-Sheet 1
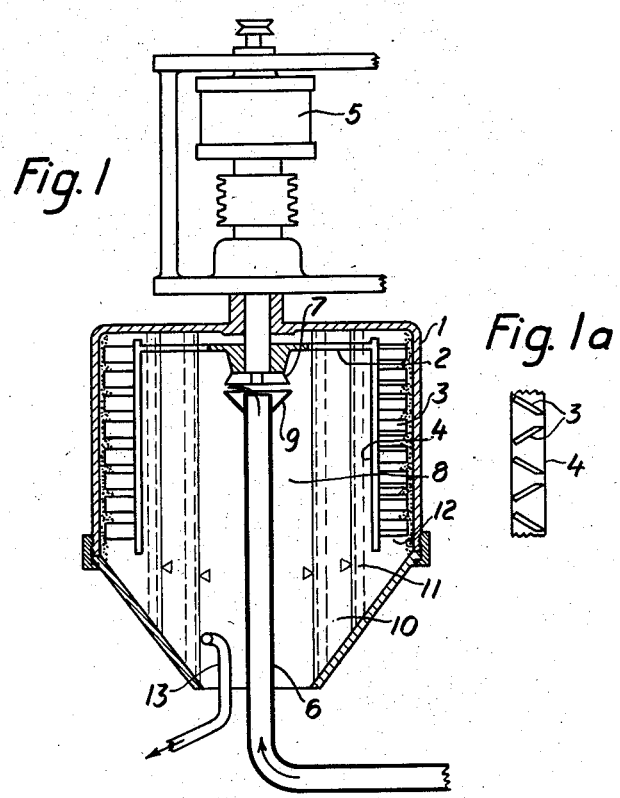
INVENTOR.
Sven Alfred Bertil Dahlgren
BY Davis, Hoxie r Faithfull

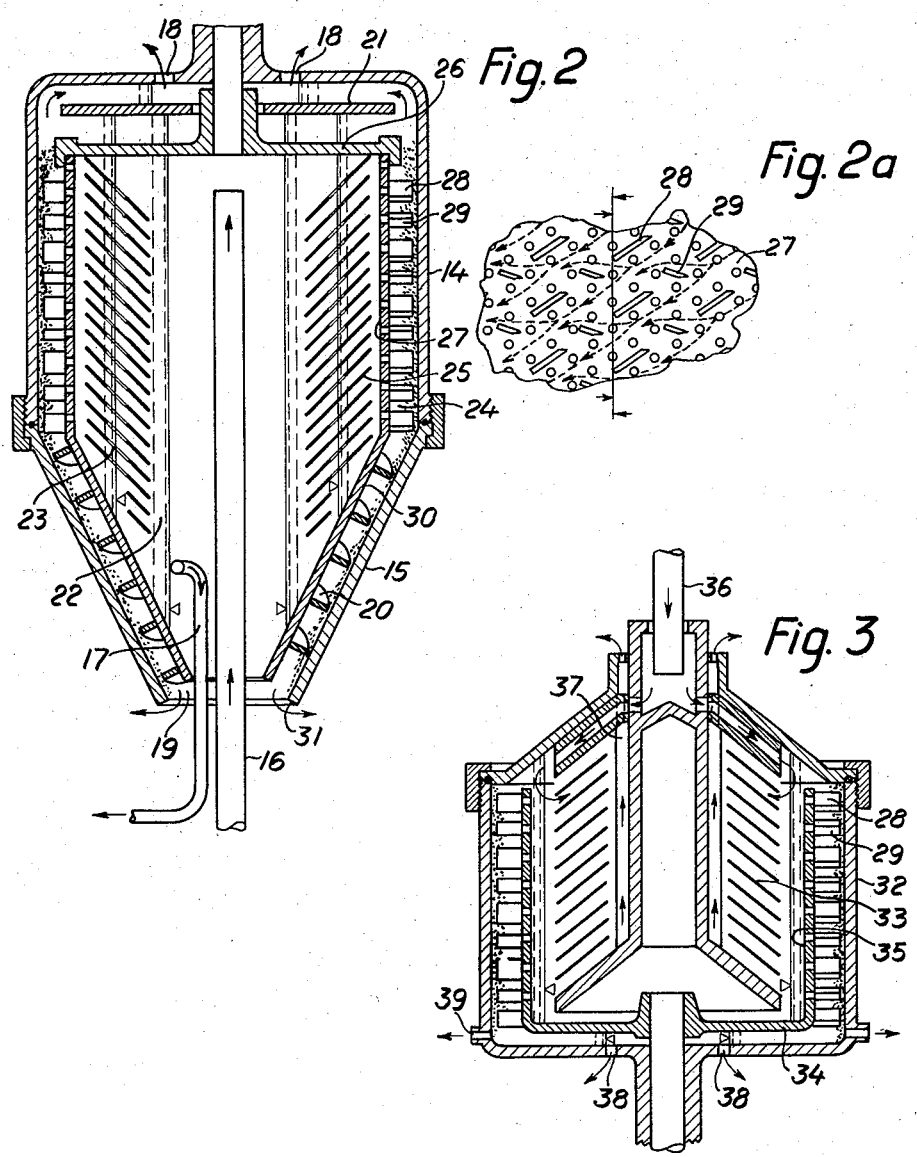

United States Patent Office 2,862,658
Patented Dec. 2, 1958

2,862,658

METHOD AND APPARATUS FOR CENTRIFUGAL SEPARATION OF A MIXTURE OF SOLIDS AND TWO LIQUIDS

Sven Alfred Bertil Dahlgren, Bromma, Sweden, assignor to Aktiebolaget Separator, Stockholm, Sweden, a corporation of Sweden Application May 15, 1953, Serial No. 355,276

Claims priority, application Sweden May 28, 1952

1 Claim. (Cl. 233—7)

The present invention relates to a method and apparatus for centrifugally separating a mixture of two liquids, which are not soluble in one another and are of different specific gravities, and solids of higher specific gravity than the liquids, such as a mixture of oil, water and solids.

In the oil industry (treating mineral, vegetable and animal oils), it is often necessary to separate a mixture of oil, water (or water solution) and solids, preferably by centrifuging, with the object of obtaining the smallest possible oil loss. If such a mixture is separated directly in a sludge centrifuge, three layers are formed in the centrifugal bowl, namely, an oil layer nearest the center of the bowl, a water layer outside the oil layer, and, at the wall of the bowl, a layer of solids or sludge. As a result of the adhesion of the oil to the solids, the sludge, after the centrifuging, will contain a considerable amount of oil which is not freed from the sludge, even if the centrifuging is carried out for a long period of time. It has been proposed heretofore to recover the oil content of the sludge, after its discharge from the centrifuge, by stirring and/or grinding it in a suitable device to which water is added, the sludge from this device being then centrifuged again. However, this is a lengthy and laborious procedure.

According to the present invention, by which the above-mentioned inconveniences are avoided, the sludge consisting of the solids collected at the wall of the centrifugal rotor in the sludge chamber, is subjected throughout the centrifuging operation to mechanical working in addition to such working as may occur when discharging the sludge during continuous operation. Applied to oil separation processes, this gives an improved de-oiling of the sludge and, accordingly, a better oil yield.

In order that the effect (the de-oiling of the sludge in the example mentioned above) obtained according to the invention shall not be impaired when the various mixture components are discharged from the centrifuge, care should be taken that the sludge is removed from the centrifuge without coming into contact with the liquid of the smallest specific gravity (such as the oil mentioned above). This may be accomplished in different ways, as will be described more in detail below.

The sludge centrifuge of the present invention is characterized by means for subjecting the sludge collecting in the sludge chamber to mechanical working in addition to the working which may take place incident to discharge of the sludge during continuous operation. Preferably, the mechanical working means include a carrier mounted in the separating chamber of the centrifuge, concentric with the centrifugal rotor and rotatable at a speed different (somewhat higher or lower) from that of the rotor, the carrier serving as a support for tools extending outward into the sludge chamber and arranged to effect the mechanical working of the sludge.

For a better understanding of the invention, reference may be had to the accompanying drawings, in which Fig. 1 is a schematic view, partly in vertical section, of an intermittently operating centrifuge made according to the invention;

Fig. 1a is a detailed view of some of the paddle blades in Fig. 1, as seen in elevation looking toward the rotor axis;

Figs. 2 and 3 are schematic views in vertical section showing different forms of bowls of the continuously operating type made according to the invention, and Fig. 2a is a detail view showing in development the arrangement of the paddle blades on the carrier drums in Figs. 2 and 3.

In Fig 1, the rotor 1 forming the centrifugal locus contains a carrier 2 for the working tools, such as paddle blades, pins, knives, or the like, extending into the sludge chamber at the periphery of the rotor. These tools are shown in the form of paddle blades 3 and perform a cutting action on the sludge, so that they may be referred to as sludge-cutting means. The carrier, which consists of a support concentric to the rotor axis, has depending arms 4 which are parallel to the rotor axis and support the blades 3. These blades are alike in size and shape and extend radially outward from the arms 4. However, as shown in Figs. 1 and 1a the blades 3 are inclined alternately in opposite directions but to the same extent. This causes the sludge to be worked without being fed toward either end of the centrifuge rotor.

The carrier 2 is rotated at an angular speed somewhat different from that of the centrifugal rotor 1, as by means of a planetary gear (not shown) so that both the carrier 2 and the centrifugal rotor 1 may be driven from the same driving means 5. The mixture to be separated is fed under pressure through inlet pipe 6 and is thrown outward into the separation chamber 8 by means of wings 7 rotating with carrier 2. A conical disc 9 at the upper end of tube 6 prevents liquid from splashing downward. In chamber 8, the mixture is separated into an oil layer 10, a water layer 11, and a sludge layer 12 into which the blades 3 extend. The centrifuge here illustrated is designed for periodic discharge of the sludge, and for this purpose the centrifuge is stopped at intervals and the sludge accumulated in the sludge chamber is scraped out. Before the centrifuge is stopped, any remaining separated oil should be removed, as by means of a radially adjustable paring tube 13 which, during the centrifuging, pares out the oil and, if desired, all or part of the separated water. The feed through tube 6 is interrupted before the centrifuge is stopped, so that the separated sludge can be mechanically worked to the desired degree, or de-oiled, by the blades 3. The longer this interruption is continued, the better is the de-oiling, and the most suitable length of interruption can be determined in each individual case.

In the de-oiling process, as described, the influence of the centrifugal force in combination with the mechanical working (stirring and kneading) of the sludge causes oil drops to be released from the sludge and travel toward the center of the centrifuge, while the surrounding water takes their place in the sludge.

In Fig. 2, I have shown a centrifuge for continuous discharge of all the separated components. The upper portion 14 of the rotor forming the centrifugal locus is cylindrical and its lower portion 15 is conical. The mixture to be separated is supplied through pipe 16, the oil is discharged through paring tube 17, the water through outlets 18, and the sludge through outlet 19, to which it is fed from the sludge chamber of the centrifugal rotor by one or more conical conveyor screws 20. The wall 21, which is secured to the rotor 14—15 and located in the upper portion thereof, forms a liquid seal for the separated water, so that no oil can escape through outlets 18. The oil layer is indicated at 22, the water layer at 23, and the sludge layer at 24. To improve the separating effect, a set of conical discs 25 is arranged in the separating chamber of the centrifugal rotor. The carrier 26 supports a perforated drum 27, which is concentric with the rotor axis. The perforations of the drum allow the material under separation to pass freely through the drum wall. The drum, in turn, supports paddle blades 28 and 29 of two different types, the blades 28 being wider than blades 29 and each group inclining to about the same extent in opposite directions, as shown in Fig. 2a. The broken lines and arrows in Fig. 2a show the path of the sludge. By this arrangement of the paddle blades, the sludge is fed in opposite directions, but preponderatingly in one direction, that is, downward toward outlet 19. The same effect can, of course, be obtained even if different relative widths and inclinations of the paddle blades 28 and 29 are chosen. It will be observed that the paddle blades 28 form in effect a conveyor screw divided into separate segments, thus permitting better stirring of the sludge with less power consumption and making the screw less expensive to manufacture.

The drum 27 has at its lower portion an unperforated conical part 30 supporting the conveyor screw 20. By means of the paring tube 17, it is possible to control the free oil level in the separating chamber so that it is located radially outside the edge 31 of the conical rotor part 15. In this way, dehydration of the sludge is obtained in that the water tends to push radially outward from the sludge mass which is being transported inward by conveyor 20 to outlet 31. This arrangement also assures that the sludge discharging from the centrifuge will not again come into contact with oil.

In Fig. 3, there is shown a third embodiment of the centrifuge according to the invention. This centrifuge, which also operates continuously, has a rotor 32 which is cylindrical, and provided with a frusto-conical cover, and its separating chamber has a set of discs 33. The carrier support 34, which is an unperforated plate, supports a perforated drum 35. This drum is concentric with the rotor axis and, in turn, supports paddle blades 28 and 29 arranged as shown in Fig. 2a. The mixture to be separated is introduced through pipe 36. The separated oil discharges through channels 37, and the water through outlets 38 in the rotor bottom. The sludge, which is fed through the rotor bottom, is discharged through nozzle 39. The sludge discharged through nozzle 39 will not be as dehydrated as the sludge from the centrifuge according to Fig. 2. On the other hand, the construction of the centrifuge shown in Fig. 3 is simpler and cheaper and is suitable for those cases in which dehydration of the sludge is not of primary importance.

It will be observed that in the arrangement of the paddle blades in Fig. 2, as shown particularly in Fig. 2a, the larger blades 28 are so inclined and placed on the perforated carrier drum 27 as to be in the general form of conveyor screws adjacent the rotor periphery and extending around the rotor axis in a direction to urge the sludge toward the outlet 31. That is, the blades 28 adjacent each of the broken flow lines in Fig. 2a form such a screw-like conveyor. The smaller blades 29, which alternate with but are inclined oppositely to the blades 28, present surfaces which exert a smaller conveying action than the blades 28, whereby the sludge is fed preponderately toward outlet 31.

To illustrate the operation and advantages of the invention, when a mass of crushed and ground olives, which contains 22% oil, 50% fruit water and 28% dry substance, is separated into oil, fruit water and sludge in an intermittently operating sludge centrifuge of common size and with no means for mechanical working of the sludge in the sludge chamber, the content of oil in the separated sludge is 15 to 20% calculated on the dry substance content of the sludge. If, on the other hand, the same mass is separated in the same centrifuge but in accordance with the present invention, with stirring of the sludge during the centrifuging, the oil content of the sludge is reduced to 5 to 10%, even after a short period of centrifugation.

The centrifuge according to Fig. 2 is particularly suitable for separation of press liquid in fish oil mills, where it is desired to obtain a purified oil, a water free from solid impurities, and a dry substance which, to a high degree, is free from water and oil. This has not heretofore been possible without straining the press liquid before centrifuging, which has involved large oil losses during the straining.

A further advantage of the centrifuge according to the invention is in the treating of fish which has undergone fermentation, whereby its consistency after boiling is so loose that it is difficult to press it without special admixtures, such as pre-prepared fish meal, the purpose of which is to give the mass a more solid consistency. If the boiled fish mass is introduced directly into a centrifuge according to Fig. 2, without such admixture and without pressing, the separation will take place without difficulty and pure oil, glue water and solid de-oiled sludge will be obtained directly. As an example of this operation on an industrial scale, the sludge will contain less than 6% fat, while in prior centrifugal methods the fat content in the sludge has been about 10%.

The centrifuge of the present invention may be used to advantage in the mineral oil industry, as, for example, to separate bleaching-earth from oil. Bleaching-earth is often mixed into the oil to improve its color, and according to the usual practice, the bleaching-earth is removed by filtering after treatment. The resulting filter cake, consisting of bleaching-earth, usually contains 50% of oil, for which reason the oil loss with the bleaching-earth will be about equal to the amount of bleaching-earth which was added to the oil, usually 2 to 5%. By centrifuging the bleaching earth in the presence of water, with no special means for stirring during the centrifuging, the oil loss can be so reduced that the oil content in the bleaching-earth will be about 30%. On the other hand, by using a centrifuge according to the present invention, the oil losses are further reduced to such a degree that the content of oil in the bleaching-earth after treatment is only 15% or even less.

I claim:

In the separation of the lighter liquid from a mixture of two mutually insoluble liquids of different specific gravity and sludge solids of higher specific gravity than the liquids, with the use of a centrifugal bowl having an imperforate peripheral wall and a centrifugal locus surrounded by said wall, the method which comprises feeding the mixture into said locus and there centrifuging the mixture to separate it into an outer layer of solids, an intermediate layer of heavier liquid and an inner layer of readily separable lighter liquid, continuously agitating said outer layer of solids with short reciprocating motions substantially parallel to the rotation axis of the bowl during the centrifuging, whereby lighter liquid entrained in the solids is released therefrom and replaced by heavier liquid while the released lighter liquid passes inward to said inner layer, paring the lighter liquid from said inner layer while retaining the solids layer with residual lighter liquid as an outer layer out of contact with said inner layer in said locus, continuing to centrifuge and reciprocatingly agitate said solids layer to separate further residual lighter liquid therefrom, paring said further residual lighter liquid from the locus, and finally discharging from the locus the solids substantially freed of lighter liquid.

References Cited in the file of this patent

UNITED STATES PATENTS

| | | |
|---|---|---|
| 750,668 | Liedbeck | Jan. 26, 1904 |
| 832,191 | Holzer | Oct. 2, 1906 |
| 2,054,058 | Laughlin | Sept. 8, 1936 |
| 2,752,089 | Zachariassen | June 26, 1956 |

FOREIGN PATENTS

| | | |
|---|---|---|
| 54,301 | Norway | Aug. 20, 1934 |